United States Patent [19]

Wang

[11] Patent Number: 4,610,141
[45] Date of Patent: Sep. 9, 1986

[54] COMPOUND ENGINE WITH PLURAL STAGE INTERCOOLED EXHAUST PUMP

[76] Inventor: Lin-Shu Wang, 21 Hawks Nest Rd., Stony Brook, N.Y. 11790

[21] Appl. No.: 652,701

[22] Filed: Sep. 21, 1984

[51] Int. Cl.[4] ............................................... F02G 3/02
[52] U.S. Cl. ....................................... 60/614; 60/315; 60/599
[58] Field of Search ................. 60/315, 597, 598, 599, 60/614, 624

[56] References Cited

U.S. PATENT DOCUMENTS

| | | | |
|---|---|---|---|
| 2,898,731 | 8/1959 | Barr | 60/614 X |
| 3,389,972 | 6/1968 | Pottharst | 60/315 X |
| 3,393,668 | 7/1968 | Milgram | 60/315 X |

FOREIGN PATENT DOCUMENTS

| | | | |
|---|---|---|---|
| 566806 | 11/1923 | France | 60/599 |
| 1521265 | 8/1978 | United Kingdom | 60/614 |

Primary Examiner—Michael Koczo
Attorney, Agent, or Firm—Wolder, Gross & Yavner

[57] ABSTRACT

A compound internal combustion engine includes a piston type internal combustion engine drive coupled with a gas turbine, the piston engine exhaust gases driving the turbine whose exhaust preheats the piston engine air intake and then enters the suction input of a multistage turbocompressor driven by the gas turbine and having interstage cooling the output of the compressor discharging to exhaust.

5 Claims, 1 Drawing Figure

U.S. Patent    Sep. 9, 1986    4,610,141
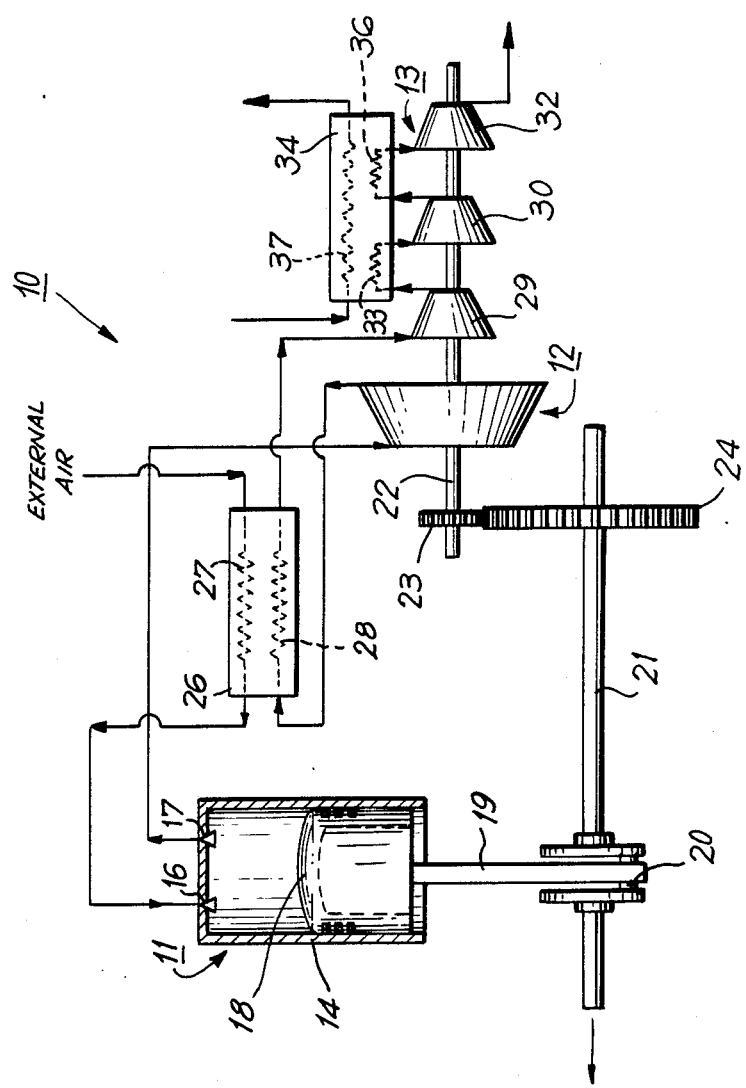

COMPOUND ENGINE WITH PLURAL STAGE INTERCOOLED EXHAUST PUMP

BACKGROUND OF THE INVENTION

The present invention relates generally to improvements in internal combustion engines and it relates particularly to an improved internal combustion compound engine.

The conventional internal combustion engine, whether of the compression ignition or Diesel type, or of the spark ignition type, possesses the disadvantage of being of low efficiency. One of the principal sources of this inefficiency resides in the high energy losses consequent to the exhaust from the engine into the atmosphere of large volumes of hot high pressure gases resulting in the wasteful dissipation of the energy contained in these gases. Many systems and expedients have been heretofore proposed or employed using internal combustion engine exhaust gases as an energy device, but these have accomplished little or nothing in improving the engine efficiency. For example, the internal combustion engine exhaust gases have been used to drive a turbocharger to deliver high volumes of air to the engine in response to increased power demands. While such exhaust gas-driven turbocharging systems have increased the power output of the engine, when required, there is either a drop or no significant increase in the engine efficiency. Additionally, other known systems employing the energy content of positive displacement internal combustion engine exhaust have been accompanied by many drawbacks and leave much to be desired.

SUMMARY OF THE INVENTION

It is a principal object of the present invention to provide an improved internal combustion engine of relatively high efficiency.

Another object of the present invention is to provide an improved high efficiency compound internal combustion engine.

Still another object of the present invention is to provide an improved compound internal combustion engine employing the exhaust gases of a positive displacement internal combustion engine as a turbine drive medium to increase the drive output of the engine.

A further object of the present invention is to provide a compound internal combustion engine of the above nature characterized by its reliability, high efficiency, ruggedness and great flexibility and adaptability.

The improved compound engine in accordance with the present invention essentially includes a positive displacement internal combustion engine having an air inlet and a combustion gas exhaust outlet, a gas turbine drive coupled with said positive displacement engine and having a drive medium inlet and an outlet, coupling means providing gas communication between said positive displacement engine outlet and said turbine inlet, and suction means having an inlet communicating with said turbine outlet.

In the preferred form of the improved compound engine, the internal combustion engine is of the reciprocation or rotary piston type and its outlet is connected to the turbine inlet and its inlet is in communication with the air in the case where compression ignition is employed through a first section of a heat exchange unit which is in heat exchange relationship with a second section. The drive output of the turbine is connected to the drive output of the piston engine by a speed-reducing transmission and drives a multistage turbocompressor with interstage cooling and whose suction inlet is connected through the heat exchange unit second section to the turbine outlet and whose outlet exhausts into the ambient atmosphere. Where the internal combustion engine is of the spark ignition type, the heat exchange unit first section advantageously is deleted, and the second section is in heat transfer relationship with the cooling section of the compressor interstage cooling. The gas volume suction capacity of the turbo-compressor exceeds the gas volume exhaust of the turbine.

The improved internal combustion compound engine is simple, rugged and highly efficient, has a wide range of applicability and is of great versatility and adaptability.

BRIEF DESCRIPTION OF THE DRAWING

The figure of the drawing is a diagrammatic view of a compound engine embodying the present invention.

DESCRIPTION OF THE PREFERRED EMBODIMENT

Referring now to the drawing which illustrates a preferred embodiment of the present invention, the reference numeral 10 generally designates the improved internal combustion engine which includes a positive displacement internal combustion engine 11, a gas turbine 12 and a positively driven suction device 13. The positive displacement engine 11 is illustrated as a reciprocating piston type including a cylinder 14, having suitably driven and timed input and output valves 16 and 17, respectively, and a reciprocating piston 18 connected by a connecting rod 19 to a crank pin 20 of a main drive crank shaft 21. The engine 11 may be of the compression or spark ignition type with carburetor or fuel injection and may be of the piston reciprocation or rotary piston or expanding chamber type such as a Wankel engine. Moreover, engine 11 may be a single or multiple cylinder engine and may be provided with a cylinder scavenging mechanism.

Turbine 12 may be of the centrifugal or of the in-line (axial) type and includes a drive shaft 22 which is drive-coupled with shaft 21 through a gear reduction transmission including a spur gear 23 mounted on shaft 22 and engaging a gear 24 mounted on shaft 21. The drive medium of turbine 12 is the exhaust combustion gas from cylinder 14 through the port of exhaust valve 17 to the inlet of turbine 12 by way of suitable manifolds and conduits. The air input to cylinder 14 through valve 16 is by way of an air preheater 26 in which external air passes through a preheater section 27 in heat transfer relationship with a preheater section 28 through which the exhaust gas from turbine 12 travels to suction device 13 and is reduced in temperature.

The suction device 13 is advantageously a multistage compressor illustrated as having three stages 29, 30 and 32, connected in series, each compressor stage being either an in-line flow or centrifugal rotary compressor the rotors of which are affixed to or driven by turbine drive shaft 22. The suction or inlet of the first compressor stage 29 is connected through the preheater-cooled section 28 to the outlet of turbine 12 and the outlet of first stage 29 is connected through a cooled coil 33 of an interstage cooling unit 34 to the inlet of compressor second stage 30 whose outlet in turn is connected through cooled coil 36 of cooling unit 34 to the inlet of the compressor third stage 32 whose outlet is exhausted to the ambient atmosphere. A coolant carrying cooling coil 37 of the compressor interstage cooler 34 is in heat transfer relationship with cooled coils 33 and 36 and has a coolant circulated therethrough.

In the operation of the improved compound engine 10 described above, the fueled positive displacement engine 11 employing as an oxidizer ambient air heated in preheater 26 by the exhaust gas of turbine 12 rotates the output drive shaft 21. The exhaust combustion gases of cylinder 14 drives turbine 12 which in turn additionally drives drive shaft 21 by way of gear reduction transmission unit 23, 24. The gas outlet of turbine 12 is drawn through preheater section 28 by the multistage interstage cooled rotary compressor suction device 13, which discharges into the ambient atmosphere. The gas volume rate of suction of compressor 13 is greater than the volume of gas exhaust of turbine 12 as cooled by preheater 26 to sharply reduce the back pressure on turbine 12 to below atmospheric at normal running conditions of engine 10, the dimensions relationships and operating parameters of the engine being adjusted to this end.

It should be noted that the preferred embodiment is advantageously employed with an internal combustion engine 11 of the compression ignition type. Where the engine 11 is of the spark ignition type, the heat exchange unit or air preheater 26 and the preheater section 27 are deleted and the heat exchange section 28 is associated with the cooling unit 34 in heat transfer relationship with the coolant carrying cooling coil 37.

The advantages of the present improved engine are increased and more pronounced as the adiabatic operational phase of the positive displacement engine 11 is introduced into practice with the use of higher temperature resisting materials.

While there has been described and illustrated a preferred embodiment of the present invention, it is apparent that numerous alterations, omissions and additions may be made without departing from the spirit thereof.

What is claimed is:

1. A compound internal combustion engine comprising a positive displacement internal combustion engine having an inlet and an exhaust gas outlet, a gas turbine drive coupled with said positive displacement engine and having an inlet communicating with said positive displacement engine outlet and a gas outlet, and suction means having a suction inlet connected to said turbine outlet, said suction means comprising a multi-stage turbo-compressor driven by said turbine and having a gas inlet communicating with said turbine outlet and an outlet exhausting into the ambient atmosphere, said multi-stage turbo-compressor including interstage cooling means.

2. The compound engine of claim 1 wherein said suction means and said turbine having connected coaxial power shafts.

3. The compound engine of claim 1 wherein said positive displacement engine includes a power shaft and said turbine includes a power shaft and comprises a speed reduction transmission coupling said turbine shaft to said positive displacement engine shaft.

4. The compound engine of claim 1 comprising a preheater including a first conduit between said positive displacement engine input and the ambient atmosphere and a second conduit between said turbine outlet and said suction inlet and in heat transfer relationship with said first conduit.

5. The compound engine of claim 1 wherein said positive displacement engine comprises a piston type engine.

* * * * *